United States Patent
Ando et al.

(10) Patent No.: US 9,667,158 B2
(45) Date of Patent: May 30, 2017

(54) POWER SUPPLY DEVICE

(71) Applicants: Masanori Ando, Aichi (JP); Yasumichi Omoto, Aichi (JP)

(72) Inventors: Masanori Ando, Aichi (JP); Yasumichi Omoto, Aichi (JP)

(73) Assignee: OMRON AUTOMOTIVE ELECTRONICS CO., LTD., Aichi (JP)

( * ) Notice: Subject to any disclaimer, the term of this patent is extended or adjusted under 35 U.S.C. 154(b) by 11 days.

(21) Appl. No.: 14/670,505

(22) Filed: Mar. 27, 2015

(65) Prior Publication Data

US 2015/0280593 A1 Oct. 1, 2015

(30) Foreign Application Priority Data

Mar. 28, 2014 (JP) ................................. 2014-068067

(51) Int. Cl.
*H02M 3/335* (2006.01)
*H02M 1/42* (2007.01)
(Continued)

(52) U.S. Cl.
CPC ......... *H02M 3/33546* (2013.01); *H02M 1/32* (2013.01); *H02M 1/42* (2013.01);
(Continued)

(58) Field of Classification Search
CPC ........ H02M 1/32; H02M 1/42; H02M 1/4225; H02M 2001/007; H02M 3/33546; H02M 3/33592; Y02B 70/126; Y02B 70/1475
See application file for complete search history.

(56) References Cited

U.S. PATENT DOCUMENTS

2004/0141339 A1 7/2004 Kotsuji et al.
2008/0101096 A1* 5/2008 Takayanagi ........... H02J 7/0013
363/17
(Continued)

FOREIGN PATENT DOCUMENTS

JP S63-36188 U 3/1988
JP H04-069051 A 3/1992
(Continued)

OTHER PUBLICATIONS

Notification of Reasons for Refusal issued in corresponding Japanese Application No. 2014-068067, mailed on Feb. 28, 2017 (8 pages).

*Primary Examiner* — Fred E Finch, III
*Assistant Examiner* — Demetries A Gibson
(74) *Attorney, Agent, or Firm* — Osha Liang LLP

(57) ABSTRACT

A power supply device includes: a power factor correction circuit which includes a capacitor and which corrects a power factor of power; a DC-DC converter which includes a switching element and which steps up or down an output voltage of the power factor correction circuit; a control unit; and a voltage detection unit which detects a voltage of an input side of the power factor correction circuit. The control unit controls the switching element such that an output voltage of the DC-DC converter is gradually reduced when stopping an operation of the DC-DC converter in a normal state in which the voltage detection unit does not detect a voltage lower than a predetermined value. When the voltage detection unit detects a voltage lower than the predetermined value, the control unit immediately turns off the switching element to stop the operation of the DC-DC converter.

7 Claims, 12 Drawing Sheets

(51) Int. Cl.
*H02M 1/32* (2007.01)
*H02M 1/00* (2006.01)
(52) U.S. Cl.
CPC ...... *H02M 1/4225* (2013.01); *H02M 3/33592* (2013.01); *H02M 2001/007* (2013.01); *Y02B 70/126* (2013.01); *Y02B 70/1475* (2013.01)

(56) References Cited

U.S. PATENT DOCUMENTS

| | | | | |
|---|---|---|---|---|
| 2010/0165668 | A1* | 7/2010 | Lin | H02M 3/28 363/21.02 |
| 2010/0226149 | A1* | 9/2010 | Masumoto | H02M 1/4225 363/20 |
| 2010/0302808 | A1* | 12/2010 | Uemura | H02M 3/22 363/15 |
| 2013/0016531 | A1* | 1/2013 | Aso | H02M 1/4225 363/16 |
| 2013/0271876 | A1 | 10/2013 | Hosotani | |
| 2014/0176049 | A1* | 6/2014 | Yamada | H02J 7/025 320/107 |

FOREIGN PATENT DOCUMENTS

| | | |
|---|---|---|
| JP | 2002/262550 A | 9/2002 |
| JP | 2004-215433 A | 7/2004 |
| JP | 2008-160967 A | 7/2008 |
| JP | 2008-220111 A | 9/2008 |
| JP | 2011-182575 A | 9/2011 |
| JP | 2012-090476 A | 5/2012 |
| JP | 2012-095511 A | 5/2012 |
| WO | 2011/129185 A1 | 10/2011 |

\* cited by examiner

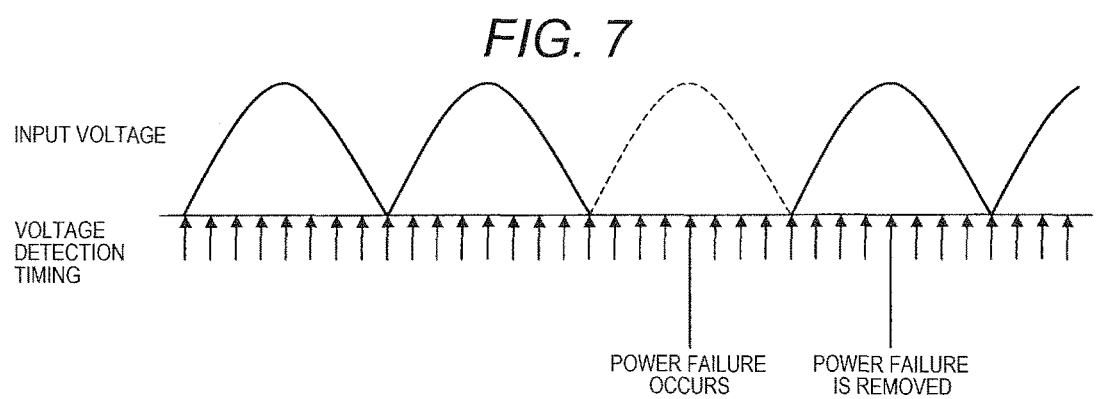

POWER SUPPLY DEVICE

CROSS-REFERENCES TO RELATED APPLICATIONS

This application is based upon and claims the benefit of priority from Japanese Patent Application No. 2014-068067, filed on Mar. 28, 2014, the entire contents of which are incorporated herein by reference.

FIELD

One or more embodiments of the present invention relate to a power supply device such as a charging device used to charge a battery, and particularly to a power supply device including a power factor correction circuit and a DC-DC converter.

BACKGROUND

A high-voltage battery which is a driving source of a traveling motor is mounted in an electric car or a hybrid car, and a charging device for charging the battery is provided. The charging device generally includes a power factor correction circuit (hereinafter, referred to as a PFC circuit) which corrects a power factor of power supplied from an AC power source, a DC-DC converter which steps up or steps down an output voltage from the PFC circuit, and a control unit which controls the PFC circuit and the DC-DC converter.

When the charging device is connected to the AC power source, and charging is started under the control of the control unit, the PFC circuit and the DC-DC converter operate, and thus the battery is charged with a DC voltage which is output from the DC-DC converter. During the charging of the battery, the control unit monitors an output voltage, and performs feedback control on the PFC circuit and the DC-DC converter so that a value of the output voltage becomes a target value. In addition, there is a case where an output current is monitored, and feedback control is performed so that a value of the output current becomes a target value. When the charging of the battery is completed, the control unit stops the operations of the PFC circuit and the DC-DC converter, and the remaining electric charge of an output capacitor provided on an output side of the DC-DC converter is released. Due to discharge of the output capacitor, an electric shock caused by the remaining electric charge is prevented.

Generally, the DC-DC converter includes a single switching element or a plurality of switching elements. As a driving signal of the switching element, a pulse width modulation (PWM) signal is generally used. When the DC-DC converter starts an operation, there is a control method of gradually increasing an output of the DC-DC converter by gradually increasing a duty of the PWM signal applied to the switching element or gradually shifting a phase of the PWM signal. This control method is referred to as "soft start control" in the present specification. The soft start control is disclosed in, for example, International Publication No. WO 2011/129185.

In addition, when the operation of the DC-DC converter is stopped, there is a control method of gradually decreasing an output of the DC-DC converter by gradually decreasing a duty of the PWM signal applied to the switching element or gradually shifting a phase of the PWM signal. This control method is referred to as "soft stop control" in the present specification. The soft stop control is disclosed in, for example, Japanese Unexamined Patent Application Publication No. H04-069051.

Japanese Unexamined Patent Application Publication No. 2008-160967 and Japanese Unexamined Patent Application Publication No. 2002-262550 disclose a technique of a stop control of a DC-DC converter. In Japanese Unexamined Patent Application Publication No. 2008-160967, in a synchronous rectification type DC-DC converter, when power supply to a load is stopped, electric charge accumulated in an output capacitor is released to the ground via a switching element of a synchronous rectification circuit. In Japanese Unexamined Patent Application Publication No. 2002-262550, in a synchronous rectification type DC-DC converter, when power supply to a load is stopped, electric charge accumulated in an output capacitor is regenerated on an input power source side via an inductor and a field effect transistor (FET).

Japanese Unexamined Patent Application Publication No. 2011-182575, Japanese Unexamined Patent Application Publication No. 2012-090476, and Japanese Unexamined Patent Application Publication No. 2012-095511 disclose a power failure countermeasure in a power supply device. In Japanese Unexamined Patent Application Publication No. 2011-182575 and Japanese Unexamined Patent Application Publication No. 2012-090476, a preconverter is provided in a previous stage of a DC-DC converter, and thus a sudden drop of an input voltage does not occur during the occurrence of a power failure. In Japanese Unexamined Patent Application Publication No. 2012-095511, in a case where a bus voltage is equal to or lower than a reference voltage, an operation of a DC load is stopped, and thus drop of the bus voltage is minimized, and a rush current in power failure recovery is minimized by a current limiting resistor.

SUMMARY

The PFC circuit includes an inductor or a capacitor. For this reason, when an operation of the DC-DC converter is stopped by immediately turning off the switching element of the DC-DC converter after charging of the battery is completed, there is a case where an overvoltage is applied to the capacitor of the PFC circuit and thus the capacitor becomes destroyed. This is because an output side of the PFC circuit is put in an unloaded state due to the operation stoppage of the DC-DC converter, and thus electric energy accumulated in the inductor is not consumed in the DC-DC converter but is applied to the capacitor as a high voltage.

There is a case where a power failure occurs during the charging of the battery. In this case, the DC-DC converter does not immediately enter a stop state and continuously performs an operation for a certain period of time due to a charge voltage of the capacitor of the PFC circuit. However, during that time, electric charge of the capacitor is released via the switching element of the DC-DC converter. Therefore, when a voltage of the capacitor is dropped due to discharge, an output voltage of the DC-DC converter is also dropped, and thus feedback control is performed so as to increase the output voltage. As a result, a duty of a PWM signal applied to the switching element of the DC-DC converter is increased according to the discharge of the capacitor, and the duty reaches 100% if a voltage of the capacitor is lower than a specific value.

Therefore, if the power failure is removed (a power source is recovered) in this state, there is a case where an excessive voltage corresponding to the duty of 100% is output from the DC-DC converter, and thus a load is damaged. In addition, since a power source voltage is suddenly applied to the capacitor in a state in which there is no electric charge in the capacitor of the PFC circuit, there is a concern that a large rush current may flow through the capacitor, and thus elements of the PFC circuit may be destroyed. Further, since the discharged capacitor is required to be charged again when a power failure is removed, and the DC-DC converter does not operate until a voltage of the capacitor becomes a predetermined level, power supply to a load cannot be rapidly resumed.

One aspect of the present invention is to prevent an overvoltage from being applied to a capacitor of a PFC circuit in a case where an operation of a DC-DC converter is stopped in a normal state. Another aspect of the present invention is to prevent damage of a load or destruction of an element and also rapidly resume power supply to the load when power failure occurs and is then removed.

In one or more embodiments of the present invention, a power supply device includes an input terminal connected to an AC power source; an output terminal connected to a load; a power factor correction circuit (PFC circuit) which includes a capacitor and which corrects a power factor of power supplied from the AC power source via the input terminal; a DC-DC converter which includes a switching element and which steps up or down an output voltage of the PFC circuit based on turning-on and turning-off of the switching element; a control unit which controls the PFC circuit and the DC-DC converter; and a voltage detection unit that detects a voltage of an input side of the PFC circuit. The control unit controls turning-on and turning-off of the switching element such that an output voltage of the DC-DC converter is gradually reduced when stopping an operation of the DC-DC converter in a normal state in which the voltage detection unit does not detect a voltage lower than a predetermined value. When the voltage detection unit detects a voltage lower than the predetermined value, the control unit immediately turns off the switching element to stop the operation of the DC-DC converter.

With the above configuration, in a case where the DC-DC converter is stopped in a state in which a power failure does not occur, since the DC-DC converter is gradually stopped through a soft stop control, an overvoltage is not applied to the capacitor of the PFC circuit, and thus it is possible to prevent the capacitor from being destroyed. On the other hand, in a case where a power failure has occurred, since the DC-DC converter is immediately stopped, an excessive voltage is not output from the DC-DC converter and the load can be prevented from being damaged when the power failure is removed. In addition, the switching element is immediately turned off, and thus the capacitor of the PFC circuit is prevented from being discharged. For this reason, when a power failure is removed, a large rush current does not flow through the capacitor of the PFC circuit, and thus it is possible to prevent an element of the PFC circuit from being destroyed and to rapidly resume power supply to the load.

In the power supply device of one or more embodiments of the present invention, the DC-DC converter may include one or more switching elements driven by using a PWM signal, and the control unit may gradually change one of a duty and a phase of the PWM signal applied to the one or more switching elements such that the output voltage of the DC-DC converter is gradually reduced when the operation of the DC-DC converter is stopped in the normal state in which the voltage detection unit does not detect a voltage lower than the predetermined value.

In the power supply device of one or more embodiments of the present invention, the control unit may stop an operation of the PFC circuit after stopping the operation of the DC-DC converter.

In the power supply device of one or more embodiments of the present invention, the control unit may stop supply of power from the AC power source after stopping the operation of the PFC circuit.

In the power supply device of one or more embodiments of the present invention, the control unit may electrically disconnect the load after stopping the supply of power from the AC power source.

In the power supply device of one or more embodiments of the present invention, the voltage detection unit may detect the voltage of the input side of the PFC circuit at a predetermined cycle, and the control unit may determine that a power failure has occurred in a case in which the voltage detected by the voltage detection unit is continuously lower than the predetermined value for a predetermined number of times.

In the power supply device of one or more embodiments of the present invention, in a case in which the control unit determines that the power failure has occurred, and then a voltage detected by the voltage detection unit is continuously equal to or higher than the predetermined value for a predetermined number of times, the control unit may determine that the power failure is removed.

According to one or more embodiments of the present invention, it is possible to prevent an overvoltage from being applied to a capacitor of a PFC circuit in a case where an operation of a DC-DC converter is stopped in a normal state. In addition, it is possible to prevent a damage of a load or destruction of an element and also to rapidly resume the power supply to the load when power failure occurs and is then removed.

BRIEF DESCRIPTION OF THE DRAWINGS

FIG. 7 is a diagram showing an example of a specific method of detecting a power failure;

DETAILED DESCRIPTION

Figure 1:
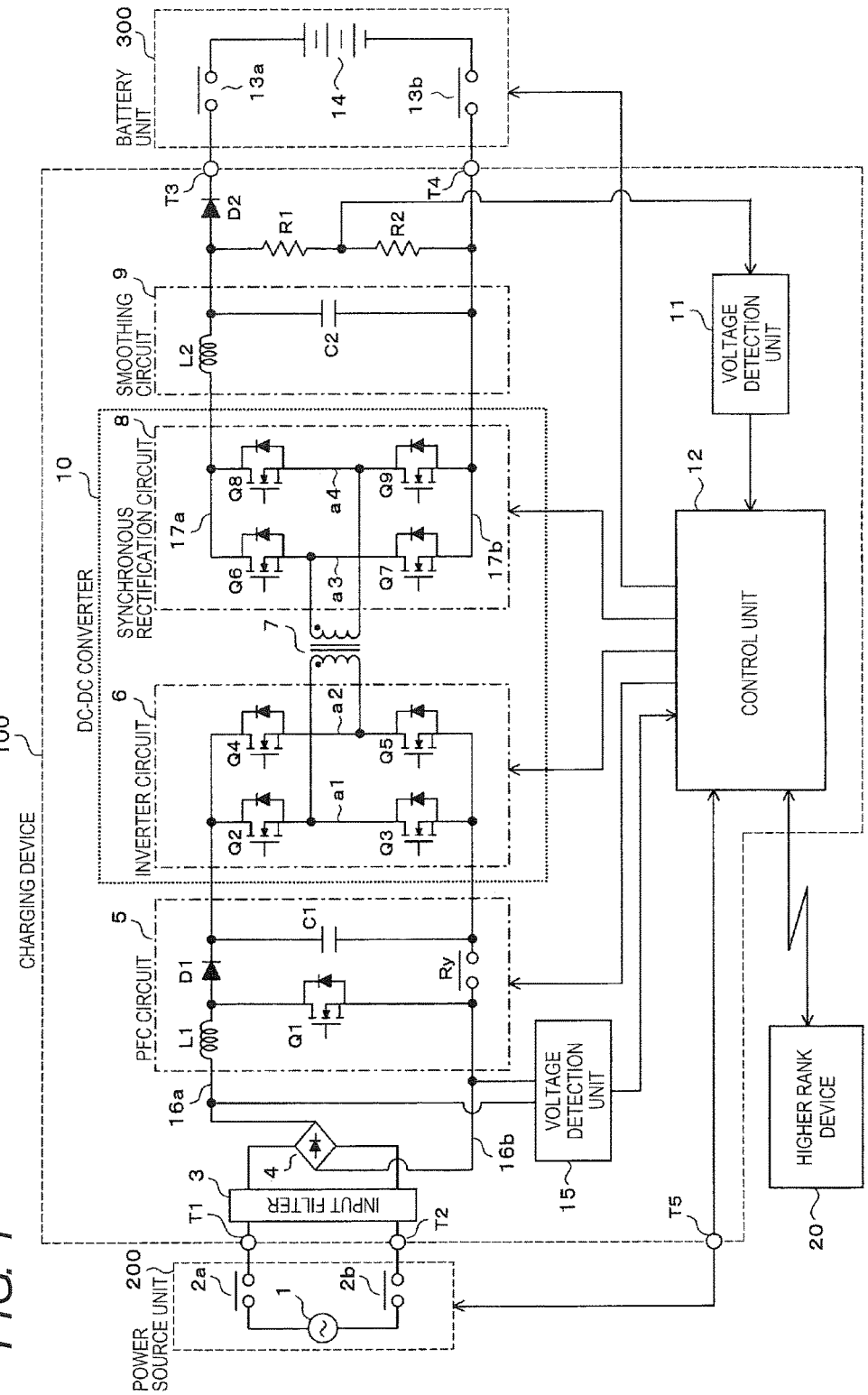
FIG. 1 is a circuit diagram showing a charging device according to an embodiment of the present invention.

Hereinafter, embodiments of the present invention will be described with reference to the drawings. In embodiments of the invention, numerous specific details are set forth in order to provide a thorough understanding of the invention. However, it will be apparent to one of ordinary skill in the art that the invention may be practiced without these specific details. In other instances, well-known features have not been described in detail to avoid obscuring the invention. In the figures, the same parts or corresponding parts will be given the same reference characters. Hereinafter, a charging device used to charge a battery will be exemplified as one embodiment of a power supply device.

First, with reference to FIG. 1, a configuration of a charging device will be described. In FIG. 1, a charging device 100 is disposed between a power source unit 200 and a battery unit 300. The charging device 100 is provided with input terminals T1 and T2 connected to the power source unit 200, a control terminal T5, and output terminals T3 and T4 connected to the battery unit 300. The charging device 100 and the battery unit 300 are mounted in a vehicle. The power source unit 200 is provided outside the vehicle.

The power source unit 200 includes an AC power source 1 and switches 2a and 2b. The AC power source 1 is a commercial power source of AC 100 V. The switches 2a and 2b are built in a charging socket (not shown in FIG. 1) for connecting the AC power source 1 to the input terminals T1 and T2.

Figure 2:
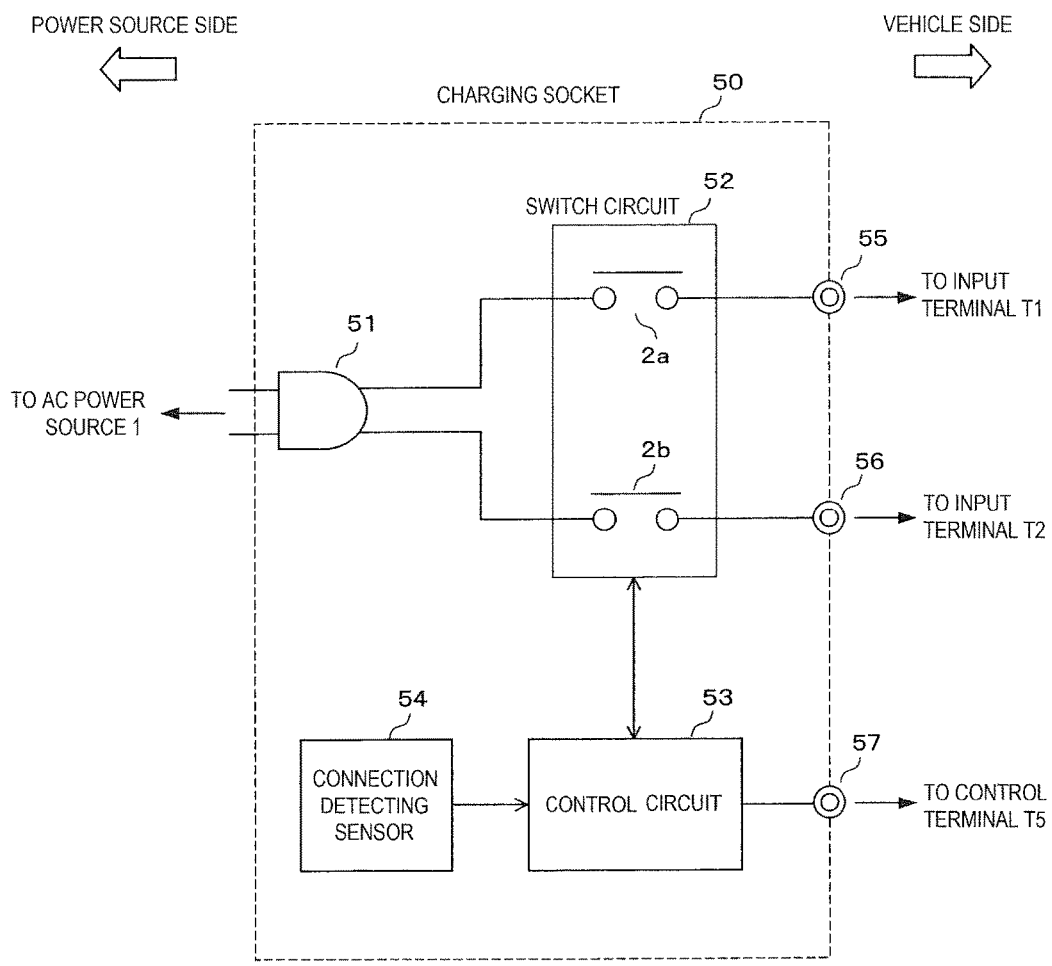
FIG. 2 is a diagram showing an electrical configuration of a charging socket.

As shown in FIG. 2, a charging socket 50 includes an AC plug 51, a switch circuit 52, a control circuit 53, a connection detecting sensor 54, power source terminals 55 and 56, and a signal terminal 57. The AC plug 51 is connected to the AC power source 1 of FIG. 1. The power source terminals 55 and 56 are respectively connected to the input terminals T1 and T2 of the charging device 100. The signal terminal 57 is connected to the control terminal T5 of the charging device 100. The switch circuit 52 is constituted by the above-described switches 2a and 2b.

A voltage of the AC power source 1 is supplied to the charging device 100 from the power source terminals 55 and 56 via the AC plug 51 and the switch circuit 52. The connection detecting sensor 54 detects that the charging socket 50 is mechanically connected to the vehicle. The control circuit 53 controls an operation of the switch circuit 52 based on a command which is input to the signal terminal 57 from the charging device 100. The control circuit 53 notifies the charging device 100 of a connection or disconnection state of the charging socket 50 via the signal terminal 57 based on an output from the connection detecting sensor 54.

The battery unit 300 includes, as shown in FIG. 1, a battery 14 and contactors 13a and 13b. The battery 14 is a high-voltage battery of several hundreds of volts, and is constituted by, for example, a secondary battery such as a lithium ion battery or a lead storage battery. The contactors 13a and 13b electrically connect or disconnect the battery 14 to or from the charging device 100.

The charging device 100 includes an input filter 3, a rectifying circuit 4, a power factor correction circuit (PFC circuit) 5, a DC-DC converter 10, a smoothing circuit 9, a voltage detection unit 11, a voltage detection unit 15, and a control unit 12.

The input filter 3 is a filter for removing noise from an AC voltage which is input to the input terminals T1 and T2. The rectifying circuit 4 is constituted by a full-wave rectification circuit having four diodes (not shown) which are bridge-connected, and performs full-wave rectification on the AC voltage which has passed the input filter 3. Output ends of the rectifying circuit 4 are connected to power source lines 16a and 16b.

The PFC circuit 5 corrects a power factor of power which is supplied from the AC power source 1. The PFC circuit 5 includes an inductor L1, a diode D1, a capacitor C1, a switching element Q1, and a relay Ry. The switching element Q1 is constituted by, for example, a field effect transistor (FET). A waveform of an output current of the rectifying circuit 4 becomes similar to a waveform of an output voltage through a fast switching operation of the switching element Q1, and thus a power factor is corrected. At this time, an input voltage is stepped up by the inductor L1, and the stepped-up voltage is rectified and smoothed by the diode D1 and the capacitor C1. The relay Ry is a protection relay for minimizing a rush current.

The DC-DC converter 10 steps up or down an output voltage of the PFC circuit 5 so as to generate a DC voltage for charging the battery 14. The DC-DC converter 10 includes an inverter circuit 6, a transformer 7, and a synchronous rectification circuit 8.

The inverter circuit 6 is provided on a primary side of the transformer 7, and is constituted by a bridge circuit having four switching elements Q2 to Q5. A leg a1 in which the switching elements Q2 and Q3 are connected in series to each other and a leg a2 in which the switching elements Q4 and Q5 are connected in series to each other are connected in parallel between the power source lines 16a and 16b. Each of the switching elements Q2 to Q5 is constituted by, for example, an FET. The inverter circuit 6 performs switching on a DC voltage which is output from the PFC circuit 5 by using the switching elements Q2 to Q5 so that the DC voltage is converted into an AC voltage, and outputs the AC voltage to the primary side of the transformer 7 (DC-AC conversion).

The synchronous rectification circuit 8 is provided on a secondary side of the transformer 7, and is constituted by a bridge circuit having four switching elements Q6 to Q9. A leg a3 in which the switching elements Q6 and Q7 are connected in series to each other and a leg a4 in which the switching elements Q8 and Q9 are connected in series to each other are connected in parallel between power source lines 17a and 17b. Each of the switching elements Q6 to Q9 is constituted by, for example, an FET. The synchronous rectification circuit 8 rectifies the AC voltage of the secondary side of the transformer 7 through switching of the switching elements Q6 to Q9 so that the AC voltage is converted into a DC voltage (AC-DC conversion). The synchronous rectification method has advantages in that a power loss in the rectifying unit is lower and conversion efficiency is higher than in a diode rectification method.

The smoothing circuit 9 is provided at an output end of the DC-DC converter 10, and smoothes an output voltage of the DC-DC converter 10. The smoothing circuit 9 includes an inductor L2 provided on the power source line 17a, and an output capacitor C2 provided between the power source lines 17a and 17b. The inductor L2 and the output capacitor C2 form a low-pass filter. Resistors R1 and R2 which form voltage dividing resistors, and a diode D2 are provided at an output end of the smoothing circuit 9. A voltage of the output capacitor C2 is output to the output terminals T3 and T4 via the diode D2 and charges the battery 14.

The voltage detection unit 11 captures a voltage of a connection point of the resistors R1 and R2, and detects a voltage of the output capacitor C2, that is, an output voltage of the charging device 100. An output of the voltage detection unit 11 is given to the control unit 12.

The voltage detection unit 15 is provided between the power source lines 16a and 16b, and detects a voltage of an input side of the PFC circuit 5. An output of the voltage detection unit 15 is given to the control unit 12.

The control unit 12 is constituted by a CPU, a pulse width modulation (PWM) circuit, and the like, and controls each of the power source unit 200, the PFC circuit 5, the inverter circuit 6, the synchronous rectification circuit 8, and the battery unit 300. Specifically, the control unit 12 performs turning-on and turning-off control of the switches 2a and 2b of the power source unit 200, turning-on and turning-off control of the switching element Q1 of the PFC circuit 5, turning-on and turning-off control of the switching elements Q2 to Q5 of the inverter circuit 6, turning-on and turning-off control of the switching elements Q6 to Q9 of the synchronous rectification circuit 8, and turning-on and turning-off control of the contactors 13a and 13b of the battery unit 300. In addition, the control unit 12 acquires a connection or disconnection state of the charging socket 50 (FIG. 2) from the power source unit 200. The control unit 12 performs communication with a higher rank device 20 forming an electronic control unit (ECU).

In the above configuration, the charging device 100 is an example of a "power supply device" in one or more embodiments of the present invention, and the battery 14 is an example of a "load" in one or more embodiments of the present invention.

Figure 3:
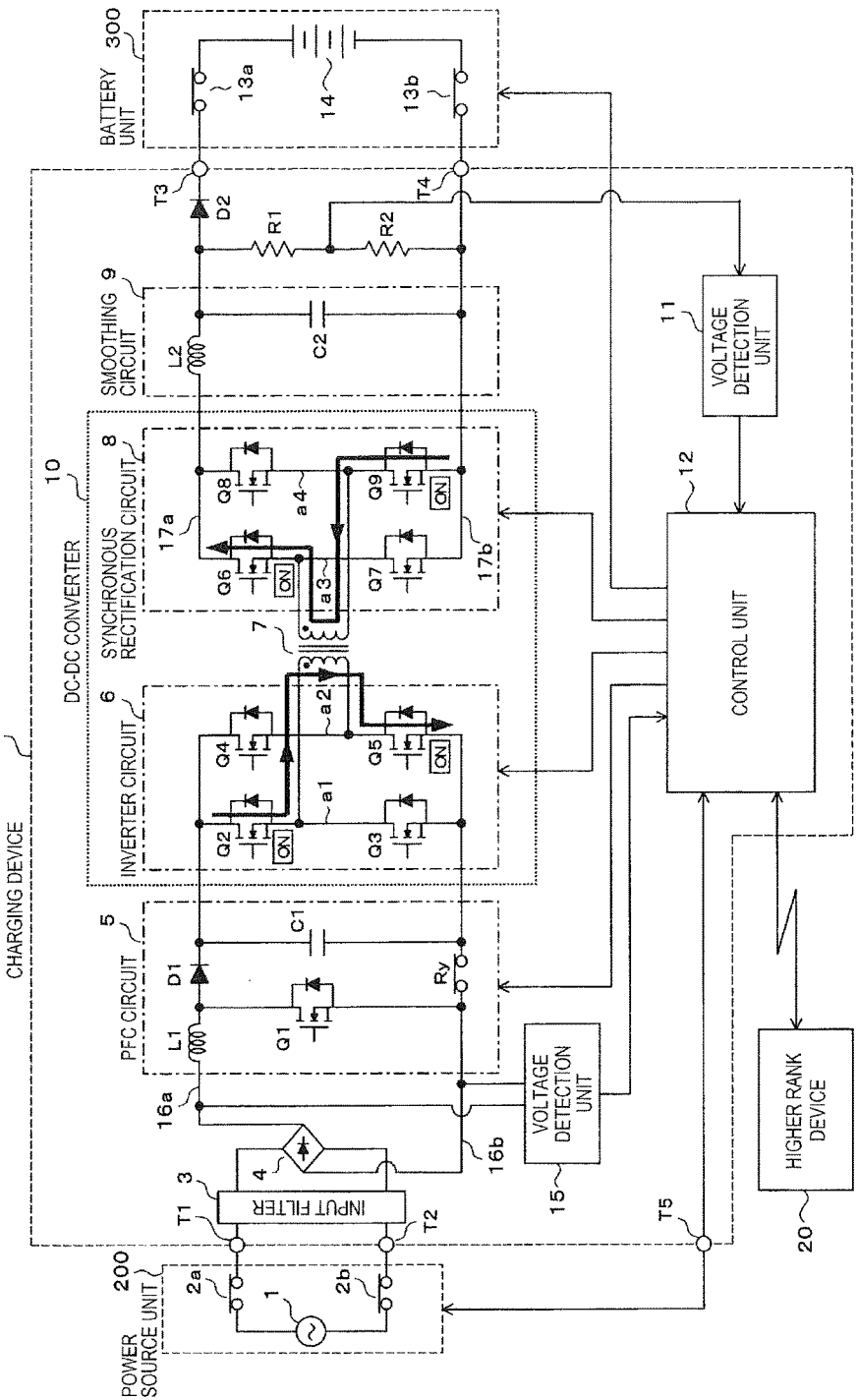
FIG. 3 is a circuit diagram showing a current path in synchronous rectification.
Figure 4:
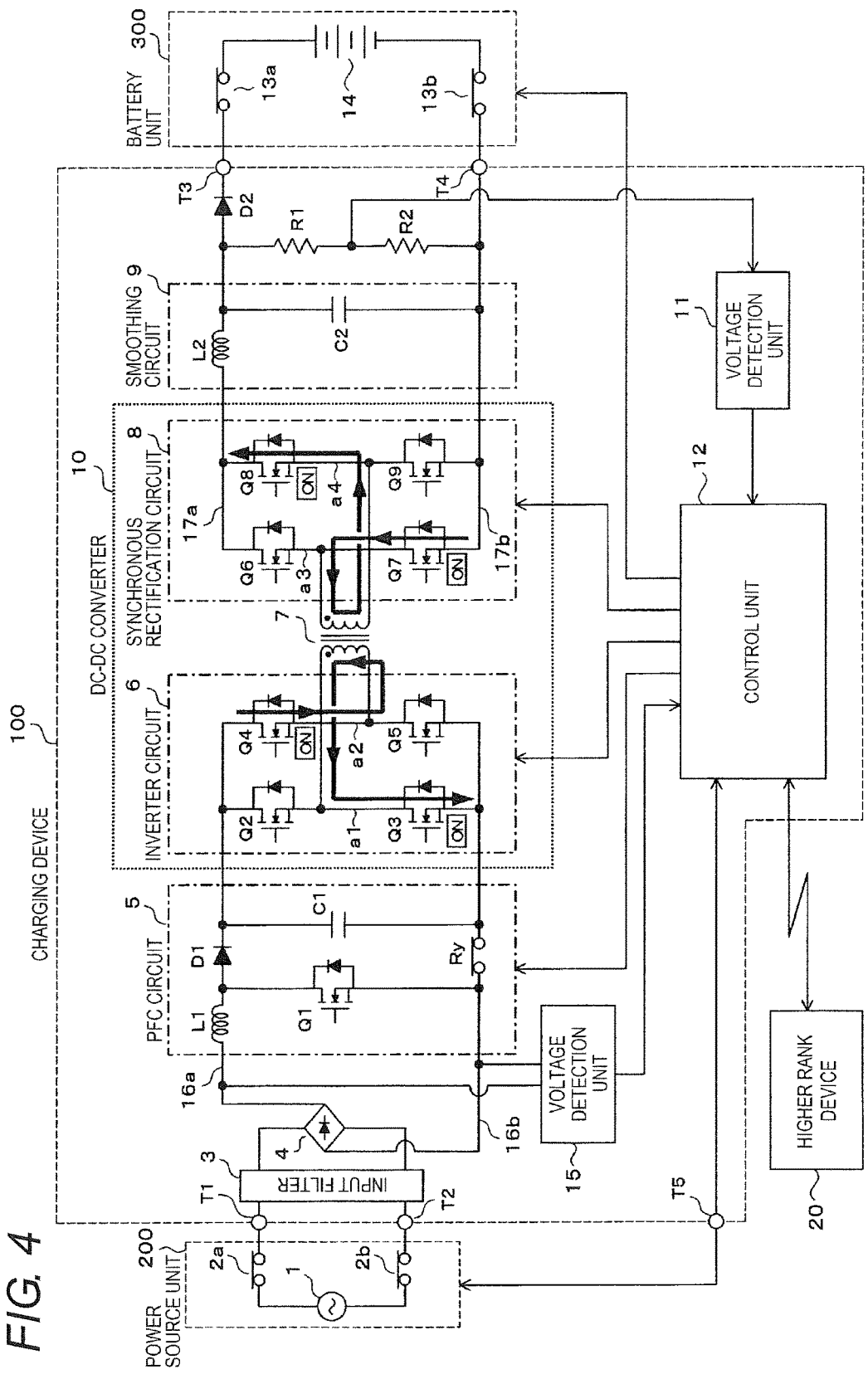
FIG. 4 is a circuit diagram showing current paths in the synchronous rectification.

Meanwhile, a switching operation of the synchronous rectification circuit 8 is performed in synchronization with a switching operation of the inverter circuit 6 under the control of the control unit 12. FIGS. 3 and 4 are diagrams for explaining the synchronous operation.

As shown in FIG. 3, when the switching elements Q2 and Q5 of the inverter circuit 6 are turned on, currents flow on the primary side of the transformer 7 along paths as indicated by thick arrows. At this time, in the synchronous rectification circuit 8, the switching elements Q6 and Q9 corresponding to the switching elements Q2 and Q5 of the inverter circuit 6 are turned on, and thus currents flow on the secondary side of the transformer 7 along paths as indicated by thick arrows.

As shown in FIG. 4, when the switching elements Q3 and Q4 of the inverter circuit 6 are turned on, currents flow on the primary side of the transformer 7 along paths as indicated by thick arrows. At this time, in the synchronous rectification circuit 8, the switching elements Q7 and Q8 corresponding to the switching elements Q3 and Q4 of the inverter circuit 6 are turned on, and thus currents flow on the secondary side of the transformer 7 along paths as indicated by thick arrows.

Figure 5:
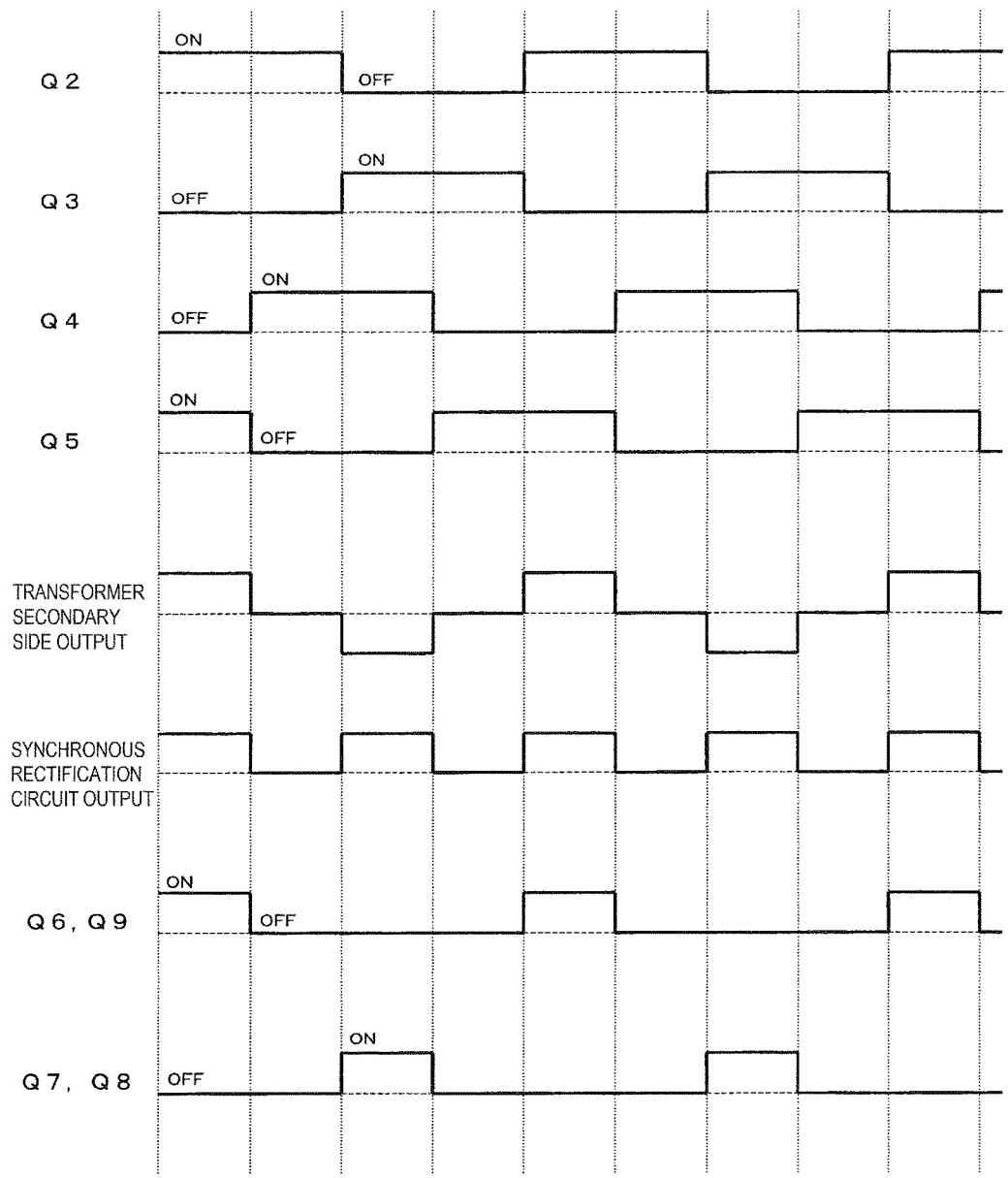
FIG. 5 is a time chart showing an operation of each unit of a DC-DC converter.

FIG. 5 is a time chart showing an operation of each unit of the DC-DC converter 10. Herein, general signal waveforms are shown in a case where the switching elements are PWM-driven in a phase shift method. Although not shown in FIG. 5, in order to prevent a short-circuited state which is caused when both of the upper and lower switching elements (Q2 and Q3, or the like) of each leg are turned on, the dead time is set between timings at which the upper and lower switching elements are switched.

Next, with reference to a flowchart of FIG. 6, a description will be made of an operation of the charging device 100 with the above-described configuration.

Figure 6:
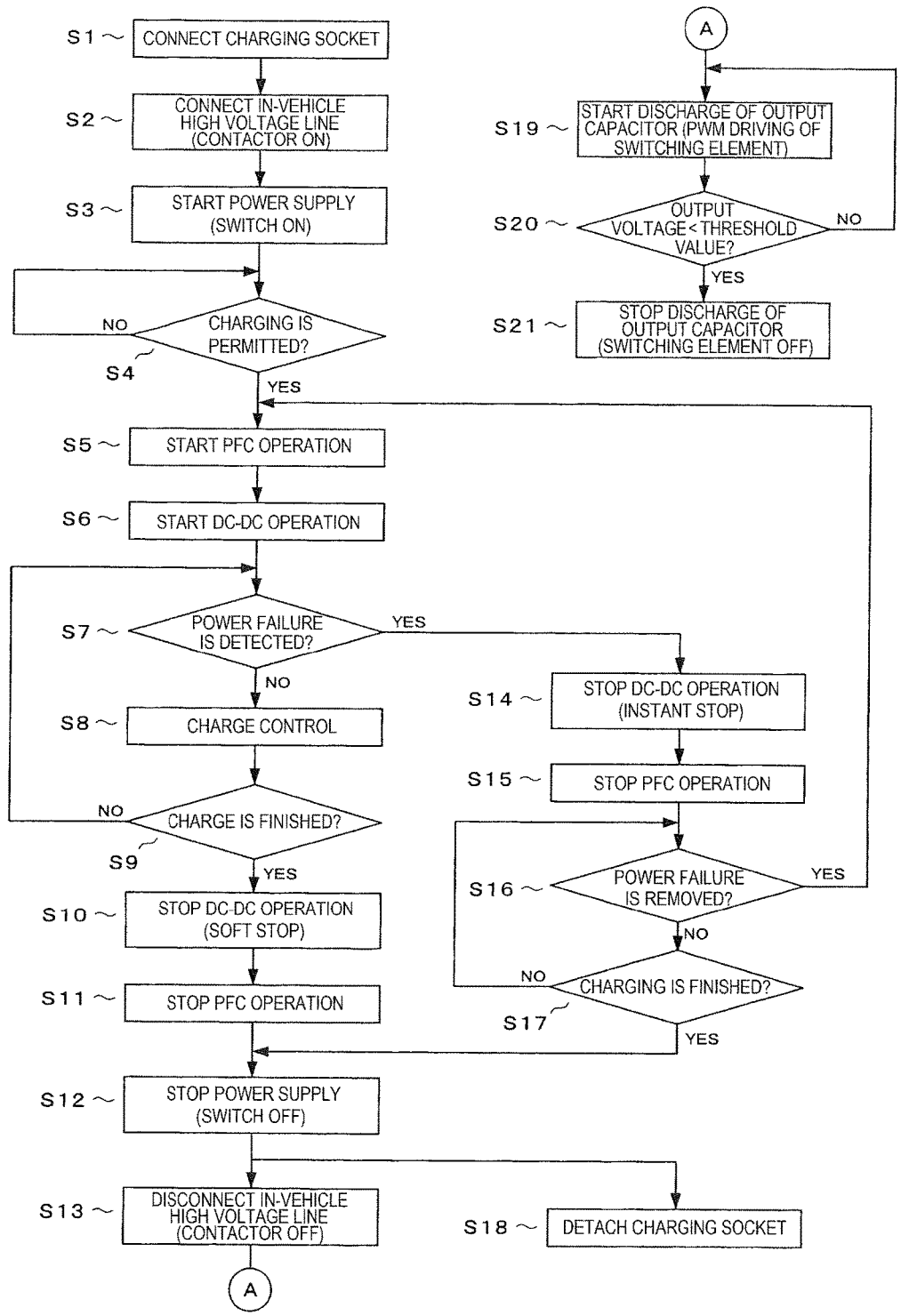
FIG. 6 is a flowchart showing an operation of the charging device.

In step S1 of FIG. 6, the charging socket 50 is connected to the vehicle. Specifically, the power source terminals 55 and 56 (FIG. 2) of the charging socket 50 are connected to the input terminals T1 and T2 of the charging device 100, and the signal terminal 57 of the charging socket 50 is connected to the control terminal T5 of the charging device 100. In this state, the switches 2a and 2b of the charging socket 50 are turned off. When the connection of the charging socket 50 is detected by the connection detecting sensor 54, and the control circuit 53 notifies the control unit 12 of the charging device 100 of the connection, the flow proceeds to step S2.

In step S2, the control unit 12 performs connection of an in-vehicle high voltage line (a line which connects the charging device 100 to the battery unit 300). Specifically, the control unit 12 outputs a control signal to the battery unit 300 so as to turn on the contactors 13a and 13b. Consequently, the battery 14 is connected to the output terminals T3 and T4 of the charging device 100 via the contactors 13a and 13b.

In step S3, the control unit 12 starts the supply of power from the power source unit 200 to the charging device 100. Specifically, the control unit 12 outputs a power supply permission signal to the charging socket 50 of the power source unit 200. The control circuit 53 of the charging socket 50 receives the power supply permission signal so as to control the switch circuit 52, thereby turning on the switches 2a and 2b. Consequently, an AC voltage of the AC power source 1 is applied to the input terminals T1 and T2 via the switches 2a and 2b.

In step S4, the control unit 12 determines whether or not charging of the battery 14 is permitted. This determination is performed based on whether or not the control unit 12 has received a charge permission signal (On signal) from the higher rank device 20. If the control unit 12 has received the charge permission signal (YES in step S4), it is determined that charging is permitted, and the flow proceeds to step S5.

In step S5, the control unit 12 starts an operation of the PFC circuit 5. Specifically, the control unit 12 applies a PWM signal to a gate of the switching element Q1 of the PFC circuit 5, and turns on the relay Ry of the PFC circuit 5. Consequently, the PFC circuit 5 is operated so that the switching element Q1 is turned on or off by the PWM signal, and thus a power factor is corrected or a voltage is stepped up as described above. Starting of the PFC circuit 5 is performed through the above-described soft start control.

Next, in step S6, the control unit 12 starts an operation of the DC-DC converter 10. Specifically, the control unit 12 applies a PWM signal to gates of predetermined switching elements (Q2 and Q5, or Q3 and Q4) of the inverter circuit 6, and applies a PWM signal to gates of predetermined switching elements (Q6 and Q9, or Q7 and Q8) of the synchronous rectification circuit 8. Consequently, the DC-DC converter 10 is operated, and the synchronous rectification as described with reference to FIGS. 3 and 4 is performed. This starting of the DC-DC converter 10 is also performed through the soft start control.

Figure 9:
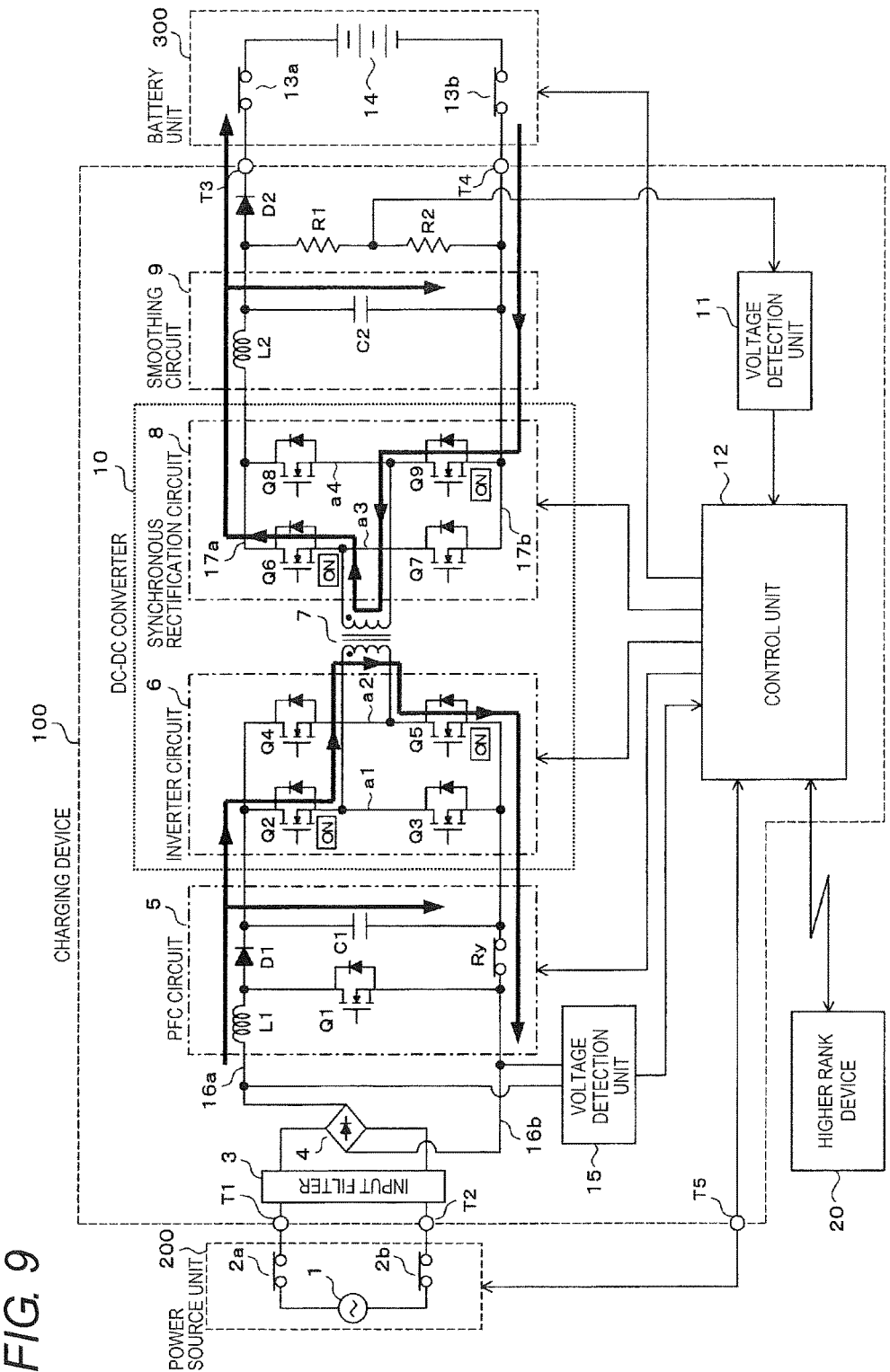
FIG. 9 is a circuit diagram showing current paths during charging of a battery.

By executing the above steps S1 to S6, the charging device 100 is put in a complete operational state. In this state, current paths as indicated by thick arrows of FIG. 9 are formed. Herein, since the switching elements Q2, Q5, Q6 and Q9 are turned on, a current path of the inverter circuit 6 and a current path of the synchronous rectification circuit 8 become the current paths shown in FIG. 3. When the switching elements Q3, Q4, Q7 and Q8 are turned on, a current path of the inverter circuit 6 and a current path of the synchronous rectification circuit 8 become the current paths shown in FIG. 4.

The DC-DC converter 10 is operated so that the output capacitor C2 is charged, and thus the battery 14 starts being charged by an output voltage developed between the output terminals T3 and T4. Then, the flow proceeds to step S7.

In step S7, the control unit 12 determines whether or not a power failure has been detected. Specifically, the control unit 12 monitors a voltage (an input voltage of the PFC circuit 5) detected by the voltage detection unit 15, and determines that a power failure has occurred when the voltage detection unit 15 detects a voltage which is lower than a predetermined value. The power failure mentioned here includes not only a power failure which lasts during a long period of time but also a power failure (instantaneous power failure) during a very short period of time, such as in a case where a voltage waveform corresponding to one cycle is missing.

FIG. 7 shows an example of a specific method of detecting a power failure. A waveform of an input voltage is a full-wave rectified waveform having undergone rectification in the rectifying circuit 4. A broken line indicates a portion in which an input voltage is missing and thus an instantaneous power failure occurs. The voltage detection unit 15 detects an input voltage of the PFC circuit 5 at a predetermined cycle (timings indicated by the arrows). In a case where a voltage detected by the voltage detection unit 15 is continuously lower than a predetermined value for a predetermined number of times, the control unit 12 determines that a power failure has occurred. In addition, in a case where a voltage detected by the voltage detection unit 15 is continuously equal to or higher than a predetermined value for a predetermined number of times after it is determined that a power failure has occurred, the control unit 12 determines that the power failure is removed.

Referring to FIG. 6 again, if a power failure is not detected in step S7 (NO in step S7), the flow proceeds to step S8.

In step S8, the control unit 12 performs charge control during charging of the battery 14. In this charge control, the control unit 12 performs feedback control on the PFC circuit 5 or the DC-DC converter 10 based on an output voltage detected by the voltage detection unit 11. Specifically, the control unit 12 controls a duty of a PWM signal given to each switching element of the PFC circuit 5 or the DC-DC converter 10 so that the output voltage reaches a target value. In addition, the control unit 12 also determines a charge current of the battery 14, selects a charge mode (for example, a power saving mode), and the like.

In step S9, the control unit 12 determines whether or not the charging of the battery 14 has been completed. This determination is performed based on whether or not the control unit 12 has received a charge stop signal (Off signal) from the higher rank device 20. If the control unit 12 has not received the charge stop signal (NO in step S9), it is determined that the charging has not been completed, and the flow returns to step S7. On the other hand, if the control unit 12 has received the charge stop signal (YES in step S9), it is determined that the charging is completed, and the flow proceeds to step S10.

Figure 8A:
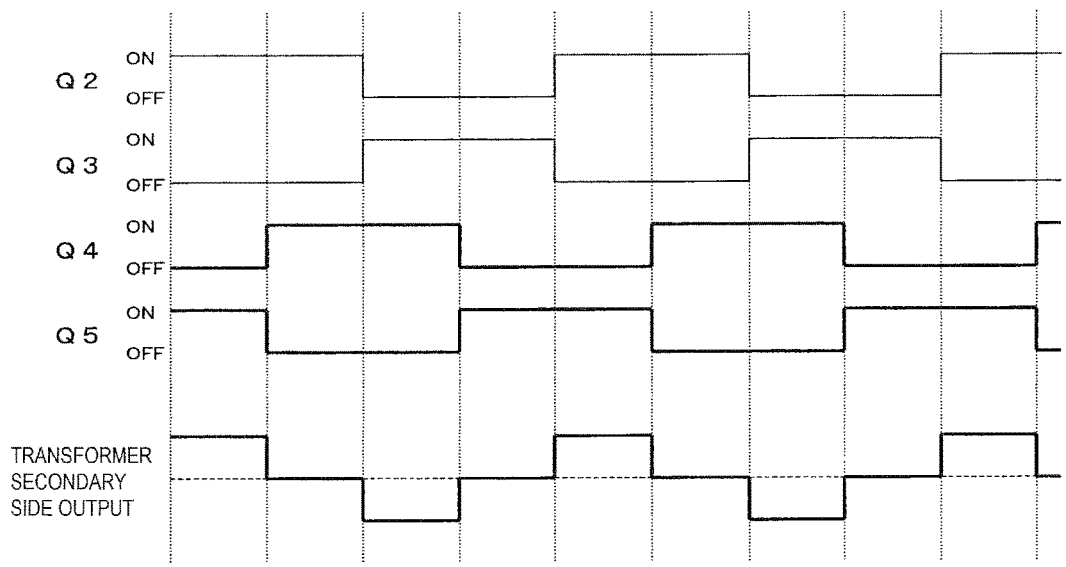
FIG. 8A is a time chart for explaining soft stop control.
Figure 8B:
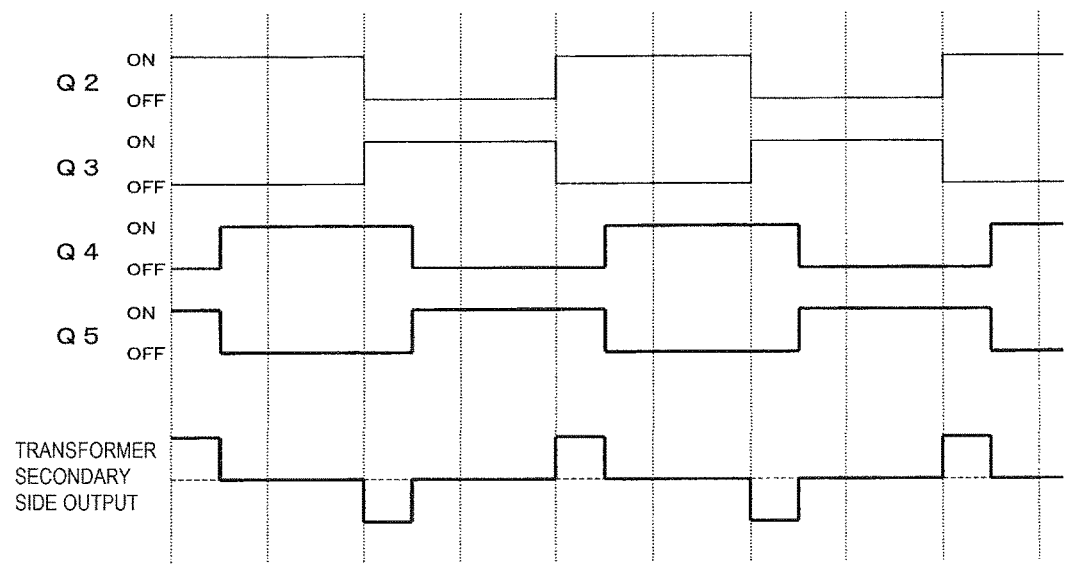
FIG. 8B is a time chart for explaining the soft stop control.
Figure 8C:
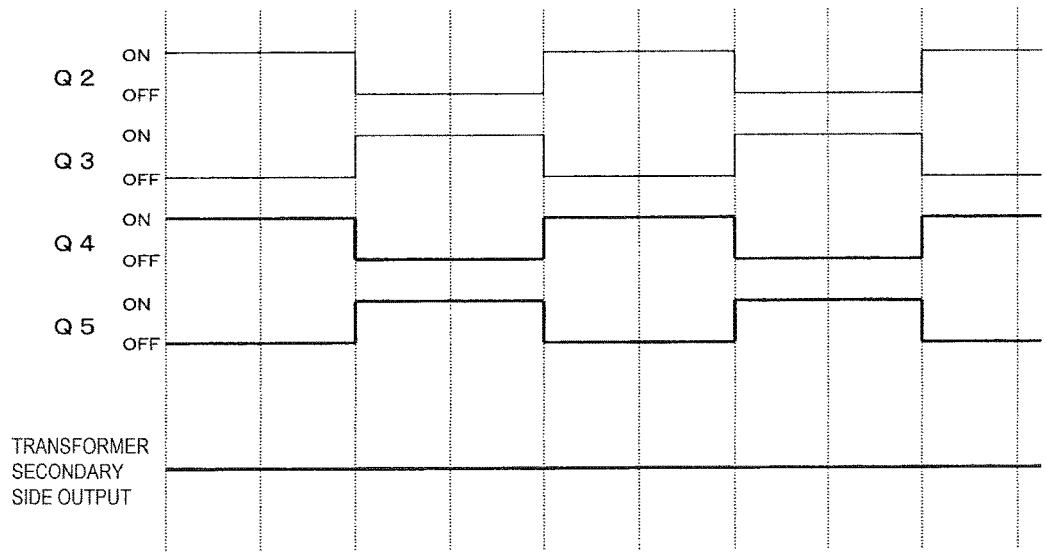
FIG. 8C is a time chart for explaining the soft stop control.
Figure 8D:
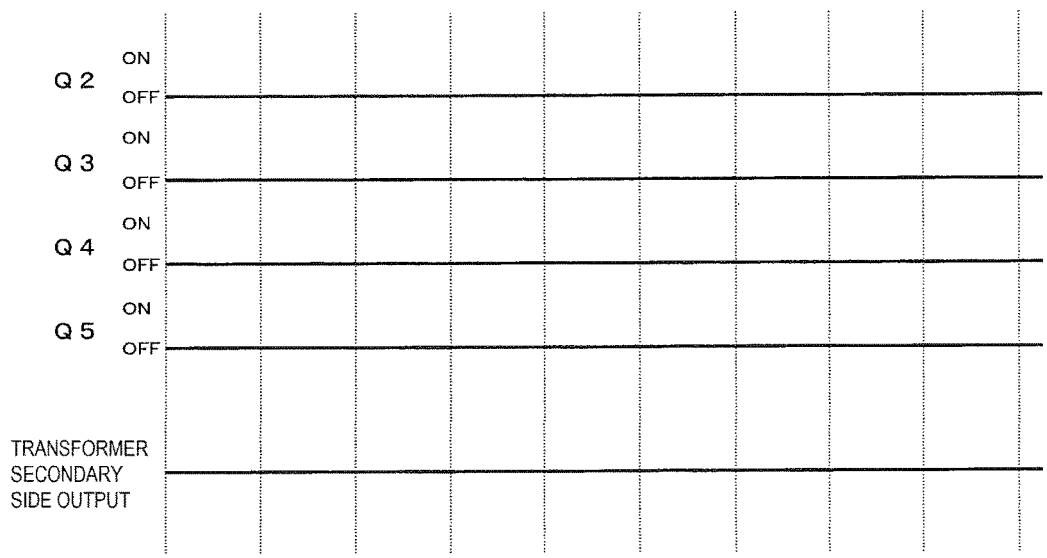
FIG. 8D is a time chart for explaining the soft stop control.

In step S10, the control unit 12 stops the operation of the DC-DC converter 10. In this case, the control unit 12 causes the DC-DC converter 10 to enter a stop state through the above-described soft stop control. Specifically, as shown in FIGS. 8A to 8D, turning-on and turning-off timings of the switching elements Q4 and Q5 are gradually shifted by gradually shifting phases of PWM signals for driving the switching elements Q4 and Q5 of the inverter circuit 6. As a result, a secondary side output of the transformer 7 gradually decreases and finally becomes zero. In addition, as shown in FIG. 8D, all the switching elements Q2 to Q5 of the inverter circuit 6 are turned off (at this time, all the switching elements Q6 to Q9 of the synchronous rectification circuit 8 are also turned off), and thus the DC-DC converter 10 stops operating. For this reason, there is no output from the DC-DC converter 10, but electric charge remains in the output capacitor C2, and thus a voltage is developed between the output terminals T3 and T4.

In addition, in a case where the switching elements Q2 to Q9 of the DC-DC converter 10 are turned off, all the switching elements Q6 to Q9 of the synchronous rectification circuit 8 may be turned off after all the switching elements Q2 to Q5 of the inverter circuit 6 are turned off, and vice versa. Further, the switching elements Q6 to Q9 of the synchronous rectification circuit 8 may continuously perform a synchronous rectification operation as they are, but are preferably all turned off in consideration of the output capacitor C2 being subsequently discharged.

Next, in step S11, the control unit 12 stops an operation of the PFC circuit 5. Specifically, the control unit 12 stops applying a PWM signal to the gate of the switching element Q1 of the PFC circuit 5 and turns off the relay Ry. Consequently, the switching element Q1 is turned off, and the operation of the PFC circuit 5 is stopped.

Next, in step S12, the control unit 12 stops supplying power to the charging device 100 from the power source unit 200. Specifically, the control unit 12 outputs a power supply inhibition signal to the charging socket 50 of the power source unit 200. The control circuit 53 of the charging socket 50 receives the power supply inhibition signal and controls the switch circuit 52 so that the switches 2a and 2b are turned off. Consequently, the charging device 100 is electrically disconnected from the AC power source 1, and thus an AC voltage of the AC power source 1 is not supplied to the charging device 100.

Next, in step S13, the control unit 12 disconnects the in-vehicle high voltage line. Specifically, the control unit 12 outputs a control signal to the battery unit 300 so that the contactors 13a and 13b are turned off. Consequently, the charging device 100 is electrically disconnected from the battery 14.

In addition, after step S12 is executed, the charging socket 50 is detached from the vehicle in step S18. Consequently, the charging device 100 is mechanically detached from the AC power source 1.

By executing steps S10 to S13, the charging device 100 is put in a complete operational stop state, and is electrically disconnected from the power source unit 200 and the battery unit 300. Then, the control unit 12 performs discharge control in steps S19 to S21 which will be described later.

On the other hand, if a power failure is detected in step S7 (YES in step S7), the flow proceeds to step S14.

In step S14, the control unit 12 stops an operation of the DC-DC converter 10. In this case, the control unit 12 stops applying a PWM signal to each gate of the switching elements Q2 to Q9 so that the switching elements Q2 to Q9 are immediately turned off, and thus the DC-DC converter 10 immediately enters a stop state.

Next, in step S15, the control unit 12 stops an operation of the PFC circuit 5. Specifically, the control unit 12 stops applying a PWM signal to the gate of the switching element Q1 of the PFC circuit 5 and turns off the relay Ry. Consequently, the switching element Q1 is turned off, and the operation of the PFC circuit 5 is stopped.

Next, in step S16, the control unit 12 determines whether or not the power failure is removed according to the method described in FIG. 7. If the power failure is removed (YES in step S16), the processes in step S5 and the subsequent steps are resumed. If the power failure is not removed (NO in step S16), it is determined in step S17 whether or not charging of the battery 14 has been completed (whether or not a charge stop signal has been received from the higher rank device 20) in the same manner as in step S9. If charging of the battery 14 has not been completed (NO in step S17), the flow returns to step S16, and if charging of the battery 14 is completed (YES in step S17), the above-described processes in steps S12, S13 and S18 are performed. Then, the flow proceeds to the discharge control in steps S19 to S21.

Figure 10:
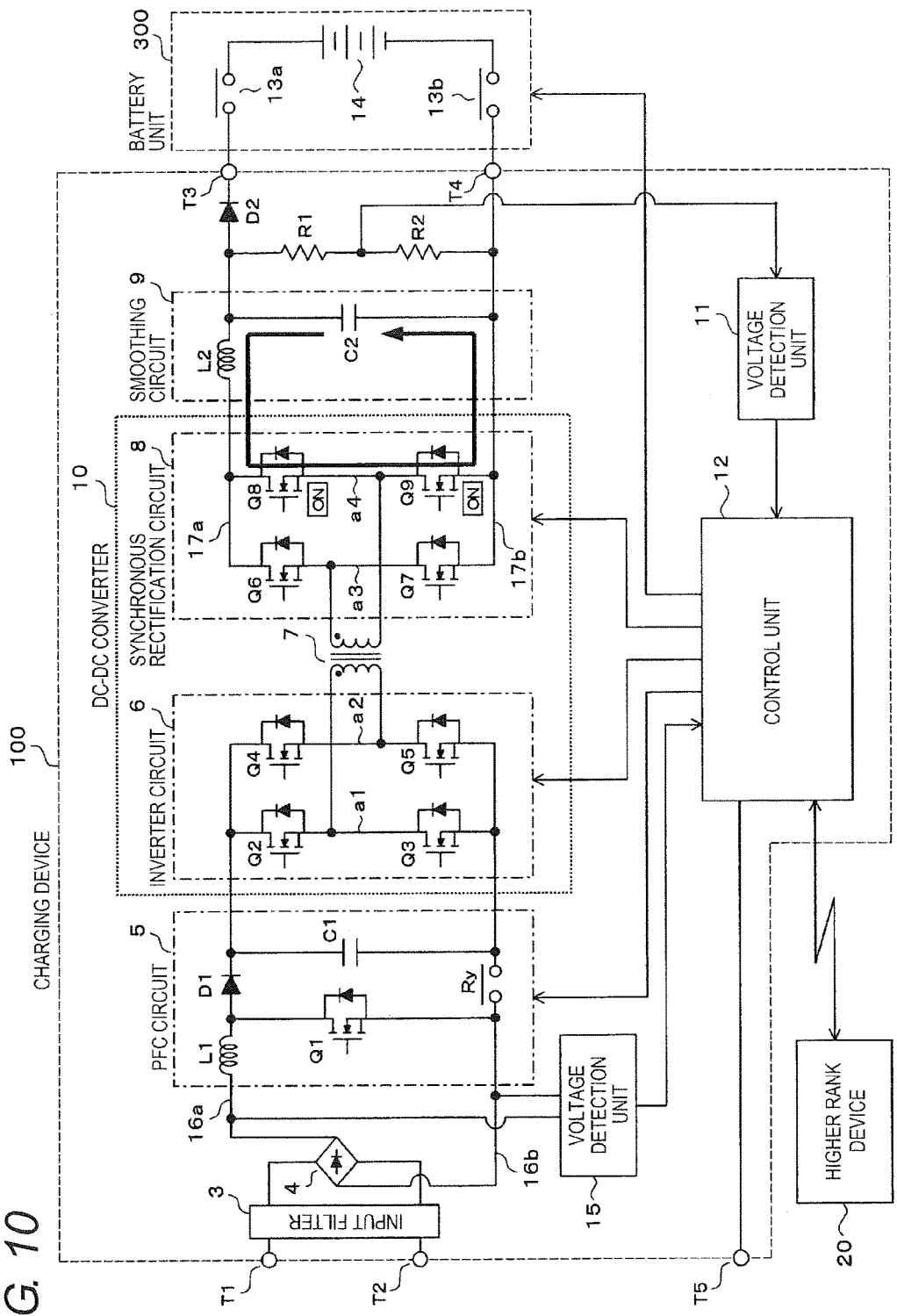
FIG. 10 is a circuit diagram showing a discharge path during discharge of an output capacitor.

Next, the discharge control will be described. In step S19, the control unit 12 starts the release of electric charge remaining in the output capacitor C2. Specifically, the control unit 12 drives the switching elements Q8 and Q9 by using PWM signals among the switching elements of the synchronous rectification circuit 8. Consequently, during a period in which the switching elements Q8 and Q9 are turned on, a discharge path as indicated by a thick arrow of FIG. 10 is formed. In addition, the electric charge remaining in the output capacitor C2 is released via the inductor L2 and the switching elements Q8 and Q9. At this time, a discharge current which flows along the discharge path is prevented from becoming excessive by the inductor L2.

It is possible to control a discharge speed or a discharge current by changing frequencies or duties of PWM signals for driving the switching elements Q8 and Q9. For example, in a case where the frequencies of the PWM signals are increased or the duties thereof are reduced, turned-on periods of the switching elements Q8 and Q9 are shortened. For this reason, a discharge speed is lowered, but a discharge current can be minimized. On the other hand, in a case where the frequencies of the PWM signals are decreased or the duties thereof are increased, turned-on periods of the switching elements Q8 and Q9 are lengthened. For this reason, a discharge current increases, but a discharge speed can be heightened. Therefore, preferably, the former control is performed right after the discharge is started, that is, when a large amount of electric charge remains in the output capacitor C2, and then the latter control is performed in stages according to the progress of the discharge.

After the output capacitor C2 starts being discharged, in step S20, the control unit 12 monitors whether or not an output voltage (a voltage of the output capacitor C2) is lower than a threshold value, based on an output of the voltage detection unit 11. If the output voltage is not lower than the threshold value (NO in step S20), the flow returns to step S19, and the switching elements Q8 and Q9 are continuously driven. In addition, if the output voltage becomes lower than the threshold value (YES in step S20), the flow proceeds to step S21.

In step S21, the control unit 12 stops the discharge of the output capacitor C2. Specifically, the control unit 12 stops outputting PWM signals to the switching elements Q8 and Q9 of the synchronous rectification circuit 8. Consequently, the switching elements Q8 and Q9 are turned off so that the discharge path of FIG. 10 is not formed, and thus the output capacitor C2 stops being discharged.

As mentioned above, the discharge operation of the output capacitor C2 is completed. In this case, a voltage of the output capacitor C2 is a value which is smaller than the threshold value, and thus it is possible to prevent a risk of an electric shock.

In addition, the remaining electric charge of the capacitor C1 of the PFC circuit 5 can also be released by controlling the switching elements Q2 to Q5 of the inverter circuit 6 in the same manner as the switching elements Q6 to Q9 of the synchronous rectification circuit 8.

Figure 11:
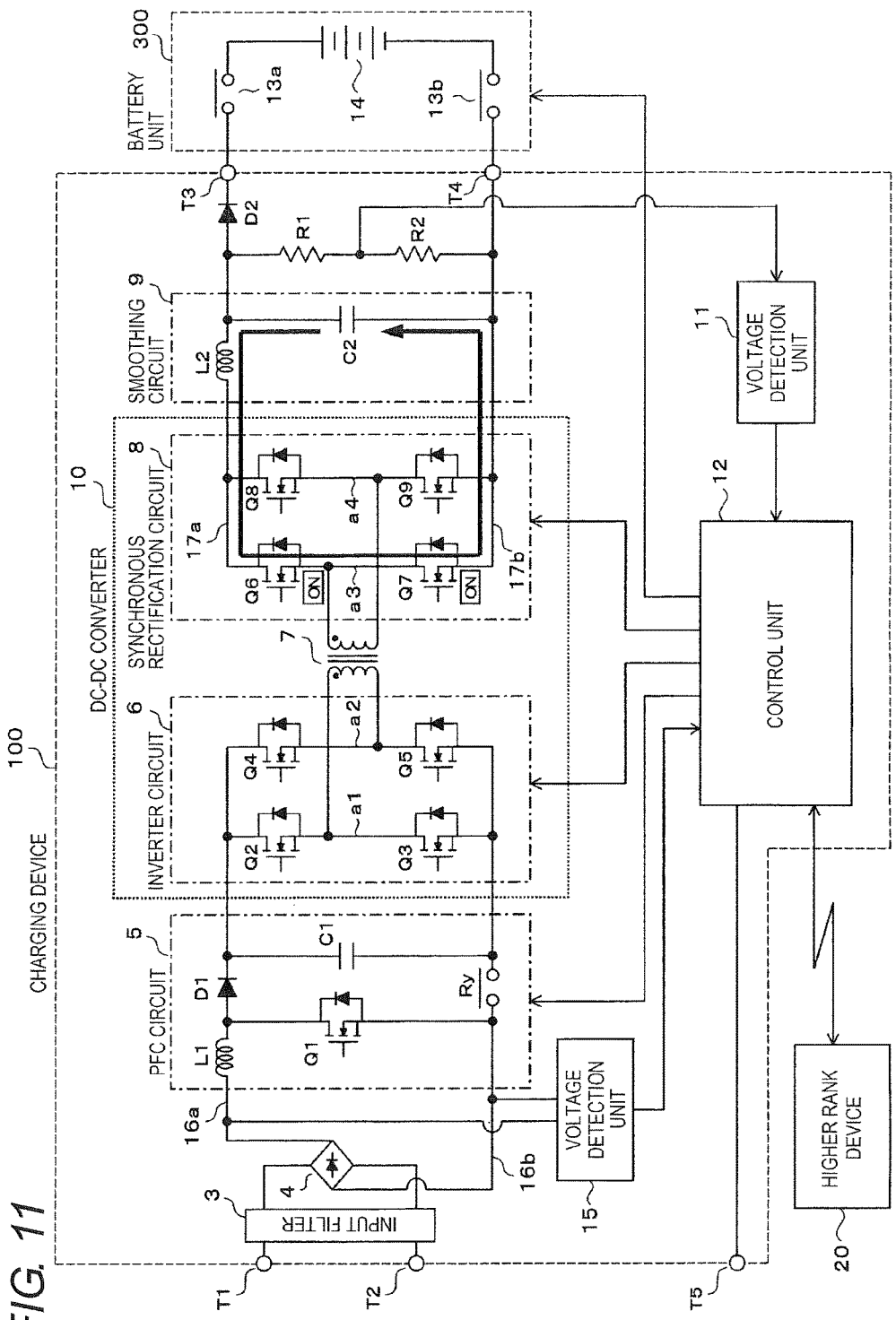
FIG. 11 is a circuit diagram showing another discharge path during discharge of the output capacitor.

In FIG. 10, the switching elements Q8 and Q9 of the leg a4 are turned on to form the discharge path, but the switching elements Q6 and Q7 of the leg a3 may be turned on. In this case, a discharge path as indicated by a thick arrow of FIG. 11 is formed.

In addition, more preferably, the switching elements Q8 and Q9 of the leg a4 and the switching elements Q6 and Q7 of the leg a3 are alternately turned on. In other words, the discharge path of FIG. 10 and the discharge path of FIG. 11 are alternately formed. In the above-described manner, a discharge current can uniformly flow through the switching elements Q6 to Q9, and thus only a specific switching element can be prevented from deteriorating earlier.

In addition, in order to form a discharge path, there may be a configuration in which a duty of a PWM signal is set to 100%, and the switching elements Q6 and Q7 or the switching elements Q8 and Q9 are fixed to a turned-on state. However, in this case, it is noted that an excessive current flows along the discharge path. As means for minimizing a large current, a relay such as the relay Ry provided on the primary side of the transformer 7 may also be provided on the secondary side of the transformer 7.

Further, in order to form a discharge path, the switching elements Q6 and Q9 or the switching elements Q7 and Q8 may be driven in the same pattern (FIGS. 3 and 4) as in the typical synchronous rectification. However, in this case, it is noted that there is a possibility that discharge of the capacitor C1 may be impeded as a result of energy being transmitted to the primary side of the transformer 7.

As mentioned above, in the above-described embodiment, in a case where charging has been completed in a normal state in which the voltage detection unit 15 does not detects a voltage which is lower than a predetermined value, the control unit 12 controls turning-on and turning-off of the switching elements Q2 to Q9 so that an output voltage of the DC-DC converter 10 is gradually reduced, and stops an operation of the DC-DC converter 10 through the soft stop control (step S10 of FIG. 6). In addition, in a case where the voltage detection unit 15 detects a voltage which is lower than the predetermined value, the control unit 12 determines that a power failure has occurred, and immediately turns off the switching elements Q2 to Q9 so that an operation of the DC-DC converter 10 is immediately stopped (step S14 of FIG. 6).

If the DC-DC converter 10 is immediately stopped when charging is completed in a state in which a power failure does not occur, as described above, an overvoltage may be applied to the capacitor C1 of the PFC circuit 5 and thus the capacitor C1 may be destroyed. However, according to the above-described embodiment, the DC-DC converter 10 is gradually stopped through the soft stop control, and thus an overvoltage is not applied to the capacitor C1 of the PFC circuit 5. Consequently, it is possible to prevent the capacitor C1 from being destroyed.

On the other hand, in a case where a power failure has occurred, electric charge of the capacitor C1 is released via the switching elements Q2 to Q5 if the DC-DC converter 10 is not immediately stopped. Then, since a voltage of the capacitor C1 is reduced, as described above, feedback control is performed so as to increase an output voltage of the DC-DC converter 10, and thus a duty of a PWM signal increases. If the power failure is removed in this state, there is a concern that an excessive voltage may be output from the DC-DC converter 10 and thus the battery 14 may be damaged. In addition, a large rush current may flow through the capacitor C1, and thus an element of the PFC circuit 5 may be destroyed. Further, when a power failure is removed, the discharged capacitor C1 is required to be charged again, and thus charging of the battery 14 cannot be rapidly resumed.

However, according to the above-described embodiment, since the DC-DC converter 10 is immediately stopped when a power failure has occurred, an excessive voltage is not output from the DC-DC converter 10 when the power failure is removed, and thus the battery 14 can be prevented from being damaged. In addition, the switching elements Q2 to Q5 are immediately turned off, and the capacitor C1 is prevented from being discharged. For this reason, when a power failure is removed, a large rush current does not flow through the capacitor C1, and thus it is possible to prevent an element of the PFC circuit 5 from being destroyed and to rapidly resume charging of the battery 14.

In the above-described embodiment, after charging of the battery 14 is completed, stoppage of the DC-DC converter 10 (step S10 of FIG. 6), stoppage of the PFC circuit 5 (step S11), stoppage of power supply from the AC power source 1 (step S12), and disconnection between the battery 14 and the charging device 100 (step S13) are performed in this order, and then the output capacitor C2 starts being discharged (step S19). If this series of sequences are not observed, the following problems occur.

For example, if the output capacitor C2 is immediately discharged (step S19 is executed after step S10) after the DC-DC converter 10 stops being operated, a period of time elapses until the output capacitor C2 is fully charged, and thus rapid recovery cannot be performed, in a case where charge of the battery 14 is just temporarily stopped.

In addition, for example, if the capacitor C2 is discharged (step S19 is executed before step S13) in a state in which the battery 14 is electrically connected to the charging device 100 (the contactors 13a and 13b are turned on), the battery 14 is short-circuited and is thus in danger in a case where there is no sufficient margin in a reverse breakdown voltage of the diode D2.

Further, for example, if the PFC circuit 5 is stopped before the DC-DC converter 10 is stopped (step S11 is executed before step S10), an output voltage of the DC-DC converter 10 is reduced so that the above-described feedback control is performed, and, as a result, an output voltage of the DC-DC converter 10 becomes excessive.

However, in the above-described embodiment, a series of sequences from the end of charging of the battery 14 to the discharge start of the output capacitor C2 is appropriately set, and control is performed according thereto. For this reason, there is no concern that the above-described problems may occur in the operation of the charging device 100, and electric charge of the output capacitor C2 can be reliably and safely released.

In addition, in FIG. 6, the order of steps S10, S11 and S13 are required to be observed, but step S12 is not necessarily executed between steps S11 and S13. For example, step S12 may be executed between steps S13 and S19. In this case, step S18 may be executed after step S12.

In FIG. 6, as described above, in order to prevent a risk of the battery 14 being short-circuited, step S13 is executed before step S19. However, in a case where there is a sufficient margin in the reverse breakdown voltage of the diode D2, there is no concern that the battery may be short-circuited, and thus step S13 may be executed after step S19. In the above-described manner, the discharge start time can be advanced. On the other hand, as in FIG. 6, in a case where step S13 is executed before step S19, an element having a high reverse breakdown voltage is not required to be used as the diode D2, and thus there is an advantage in that a cheap and small-sized diode can be used.

In one or more embodiments of the present invention, not only the above-described embodiment but also the following various embodiments may be employed.

In FIGS. 8A to 8D, in a case where the soft stop control is performed, phases of PWM signals for driving the switching elements Q4 and Q5 are gradually shifted, but phases of PWM signals for driving the switching elements Q2 and Q3 may be gradually shifted. In addition, a phase of a PWM signal may not be shifted but a duty of a PWM signal may be gradually reduced.

In FIG. 1, the DC-DC converter 10 including the inverter circuit 6, the transformer 7, and the synchronous rectification circuit 8 has been described, but is only an example, and a DC-DC converter having other circuit configurations may be used. For example, a DC-DC converter may be used in which the synchronous rectification circuit 8 is replaced with a diode rectification circuit. In addition, instead of the bridge type DC-DC converter 10 having a plurality of switching elements as in FIG. 1, a DC-DC converter having a single switching element may be used, such as a forward converter or a flyback converter. Similarly, the PFC circuit 5 is not limited to that shown in FIG. 1, and a PFC circuit having other circuit configurations may be used. In addition, the switching elements Q1 to Q9 are not limited to an FET, and may be a transistor, an IGBT, or the like.

In the above-described embodiment, the switching timing of each of the switching elements Q2 to Q9 in the DC-DC converter 10 has been set as shown in FIG. 5, but this is only an example, and a timing different from the timing shown in FIG. 5 may be set.

In the above-described embodiment, the switching elements Q1 to Q9 are driven by using PWM signals, but switching elements Q1 to Q9 may be driven by using signals other than the PWM signals.

In steps S9 and S17 of FIG. 6, it is determined whether or not charging of the battery 14 has been completed based on whether or not a charge stop signal has been received from the higher rank device 20, but this determination may be performed based on an output voltage detected by the voltage detection unit 11.

In FIG. 1, the voltage detection unit 15 is provided between the rectifying circuit 4 and the PFC circuit 5, but the voltage detection unit 15 may be provided between the input terminals T1 and T2 and the rectifying circuit 4. In addition, in a case where the voltage detection unit 15 is constituted by a resistor voltage-dividing circuit, an output of the voltage detection unit 15 is an analog voltage, but an A/D converter may be built into the voltage detection unit 15 so that a digital voltage is output. Further, in the voltage detection unit 15, whether or not a power failure has occurred may be determined through comparison between a detected voltage and a power failure threshold value, and a result thereof may be output as binary data.

In FIG. 1, the contactors 13a and 13b are provided in the battery unit 300, but the contactors 13a and 13b may be provided on the charging device 100 side.

In FIG. 2, the single signal terminal 57 is provided in the charging socket 50, and, in FIG. 1, the single control terminal T5 is provided in the charging device 100. However, these terminals may be provided in a plurality as necessary.

In FIG. 6, in a case where electric charge of the output capacitor C2 is released, discharge is stopped when a voltage of the output capacitor C2 becomes lower than a threshold value (steps S20 and S21), but the output capacitor C2 may be completely discharged until a voltage becomes zero.

In the above-described embodiment, a charging device used to charge a vehicle battery has been exemplified, but one or more embodiments of the present invention is applicable to a device which charges batteries other than the vehicle battery. In addition, one or more embodiments of the present invention is not limited to a charging device and is applicable to general devices which supply power to a load.

While the invention has been described with respect to a limited number of embodiments, those skilled in the art, having benefit of this disclosure, will appreciate that other embodiments can be devised which do not depart from the scope of the invention as disclosed herein. Accordingly, the scope of the invention should be limited only by the attached claims.

The invention claimed is:

1. A power supply device comprising:
an input terminal connected to an AC power source;
an output terminal connected to a load;
a power factor correction circuit which comprises a capacitor and which corrects a power factor of power supplied from the AC power source via the input terminal;
a DC-DC converter which comprises a switching element and which steps up or down an output voltage of the power factor correction circuit based on turning-on and turning-off of the switching element;
a control unit which controls the power factor correction circuit and the DC-DC converter; and
a voltage detection unit which detects a voltage of an input side of the power factor correction circuit,
wherein the control unit controls turning-on and turning-off of the switching element such that an output voltage of the DC-DC converter is gradually reduced when stopping an operation of the DC-DC converter in a normal state in which the voltage of the input side of the power factor correction circuit detected by the voltage detection unit is not lower than a predetermined value, and
wherein when the voltage of the input side of the power factor correction circuit detected by the voltage detection unit is lower than the predetermined value, the control unit immediately turns off the switching element to stop the operation of the DC-DC converter.

2. The power supply device according to claim 1,
wherein the DC-DC converter comprises one or more switching elements driven by using a PWM signal, and
wherein the control unit gradually changes one of a duty and a phase of the PWM signal applied to the one or more switching elements such that the output voltage of the DC-DC converter is gradually reduced when the operation of the DC-DC converter is stopped in the normal state in which the voltage of the input side of the power factor correction circuit detected by the voltage detection unit is not lower than the predetermined value.

3. The power supply device according to claim 1,
wherein the control unit stops an operation of the power factor correction circuit after stopping the operation of the DC-DC converter.

4. The power supply device according to claim 3,
wherein the control unit stops supply of power from the AC power source after stopping the operation of the power factor correction circuit.

5. The power supply device according to claim 4,
wherein the control unit electrically disconnects the load after stopping the supply of power from the AC power source.

6. The power supply device according to claim 1,
wherein the voltage detection unit detects the voltage of the input side of the power factor correction circuit at a predetermined cycle, and
wherein the control unit determines that a power failure has occurred in a case in which the voltage detected by the voltage detection unit is continuously lower than the predetermined value for a predetermined number of times.

7. The power supply device according to claim 6,
wherein in a case in which the voltage detected by the voltage detection unit is continuously equal to or higher than the predetermined value for the predetermined number of times after the control unit determines that the power failure has occurred, the control unit determines that the power failure is removed.

* * * * *